Figure 1:
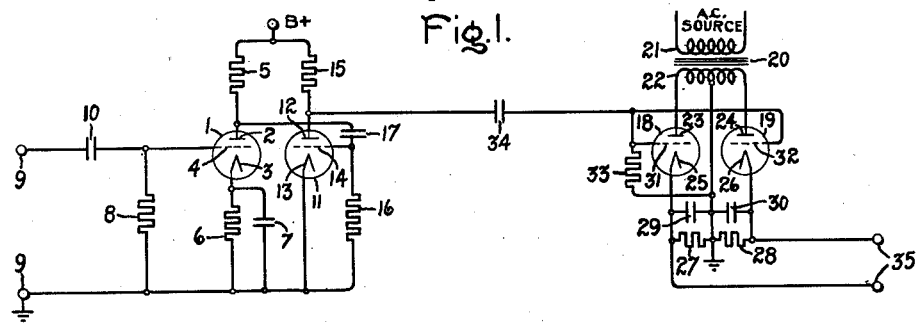

June 13, 1950

D. M. JACOB 2,511,671

PEAK COMPARATOR CIRCUIT

Filed April 1, 1947

Inventor:
Don M. Jacob,
by Prowell P. Mack
His Attorney.

Patented June 13, 1950

2,511,671

UNITED STATES PATENT OFFICE 2,511,671

PEAK COMPARATOR CIRCUIT

Don M. Jacob, Schenectady, N. Y., assignor to General Electric Company, a corporation of New York Application April 1, 1947, Serial No. 738,711

3 Claims. (Cl. 250—27)

My invention relates to peak comparator circuits, and more particularly to a peak comparator which measures the magnitude and sense of the difference between adjacent pulses in a series of periodically recurring pulses in which alternate pulses depend in magnitude upon a first condition to be measured and the remaining pulses depend in magnitude upon a second condition to be measured.

Devices for measuring small values, such as low intensity X-ray radiations or small illumination intensities, usually employ vacuum tube amplifier means in order to obtain indications sufficiently large to be presented visually on indicating means of the usual type. Such a system is accurate and correspondingly useful only to the degree of accuracy with which it may be calibrated. It is known that any shift in vacuum tube characteristics or circuit parameters affects the accuracy of a calibrated device, and frequent re-calibration is necessary if accuracy is to be maintained.

Inaccuracies caused by calibration changes within a device may be essentially eliminated if the device is utilized in such fashion that it periodically measures or indicates the effect caused by a known standard quantity, and alternately measures periodically the effect of a condition to be measured where such known standard and condition to be measured are of such type as to influence the device in similar fashion. In a copending application of C. W. Clapp, now Patent 2,467,812, issued April 1, 1949, and assigned to the assignee of this application, my invention is disclosed in combination with means whereby the output of a phototube has alternately a magnitude dependent upon the X-ray beams striking a fluorescent screen and upon the illumination provided by a glow lamp. Thus, a series of like polarity pulses is developed wherein alternate pulses are dependent in magnitude upon X-ray intensity, and the remaining pulses are dependent in magnitude upon the illumination provided by a glow lamp.

It is an object of my invention to provide a peak comparator whereby the magnitude of alternate pulses in a series of pulses may be compared with the magnitude of the remaining pulses in such a series of pulses in a continuous manner.

Another object of my invention is to provide a peak comparator whereby the conditions existing during one-half cycle of a periodically recurring sequence may be compared with conditions existing during the remaining portion of each of such cycles.

The features of the invention which are believed to be novel and patentable will be pointed out in the claims appended hereto. For a better understanding of the invention, reference is made in the following description to the accompanying drawings in which Fig. 1 is a circuit diagram of a preferred embodiment of my invention, and Fig. 2 is a series of reference curves utilized in describing the operation of the circuit disclosed in Fig. 1.

The circuit of Fig. 1 includes pre-amplifier and phase inverter stages which also perform a clipper action as will be described. A triode tube I possessing an anode 2, a cathode 3 and a grid 4 is utilized as a combination clipper-amplifier by connecting its anode 2 to a suitable B+ D.-C. supply through a resistor 5. The cathode 3 is connected to ground potential through a resistor 6 shunted by a biasing condenser 7. The grid 4 is connected to ground through a grid resistor 8 and is capacitively coupled to the input terminals 9 through a condenser 10. A triode tube 11 possessing an anode 12, a cathode 13 and grid 14 is utilized as an amplifier and phase inverter by connecting its anode 12 to B+ through a resistor 15 and by connecting its cathode 13 to ground potential. Grid 14 is connected to ground potential through a resistor 16 and is subjected to variation of the anode voltage of triode tube I by being capacitively coupled to anode 2 of tube I through a condenser 17. It should be understood that tubes I and 11 may be replaced by a single tube of the double triode type.

Triode tubes 18 and 19 are utilized in a peak comparator circuit embodying the features of my invention. A transformer 20, whose primary 21 may be energized from a suitable A.-C. source, possesses a center-tapped secondary 22. The frequency of this source is the same as the frequency of the two groups of pulses to be applied to terminals 9. Anode 23 of tube 18 is connected to one end of coil 22 and anode 24 of tube 19 is connected to the other end thereof. The cathodes 25 and 26 of tubes 18 and 19, respectively, are connected to ground through respective similar cathode resistors 27 and 28. A condenser 29 is connected in parallel with resistor 27 and a similar condenser 30 is correspondingly connected in parallel with resistor 28. The center tap of secondary 22 is maintained at ground potential by connection thereto. Grids 31 and 32 of tubes 18 and 19, respectively, are connected together and to ground through a common grid-leak resistor 33 and are capacitively coupled to anode 12 of tube 11 through a condenser 34 or other coupling means. It will be appreciated, after its operation has been described, that ground potential of the peak comparator circuit may be equally well maintained at either cathode 25 of tube 18 or at cathode 26 of tube 19 instead of at the center tap of secondary 22.

Figure 2:
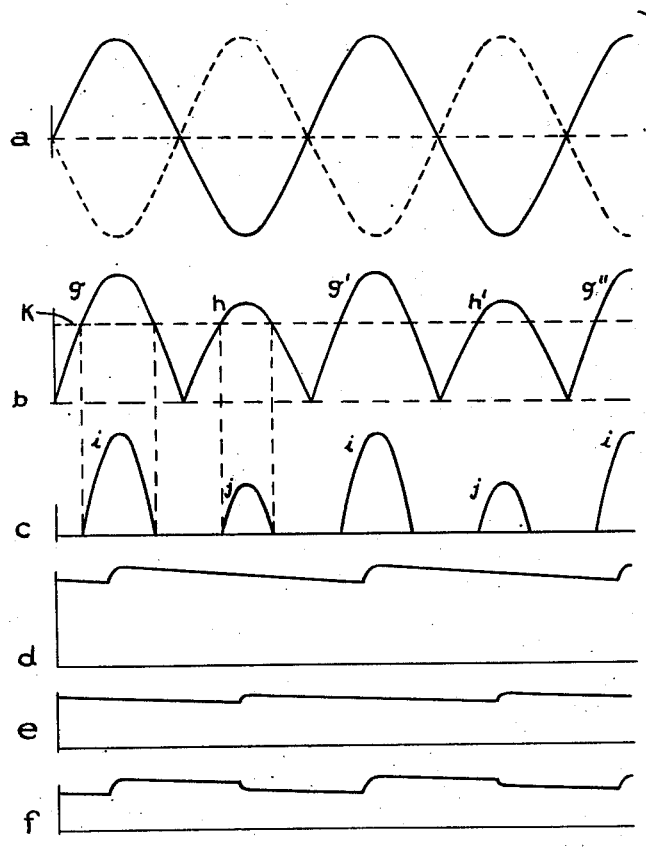

In describing the operation of the peak comparator disclosed in Fig. 1, reference is made to the curves shown in Fig. 2. If an A.-C. source, such as represented by Fig. 2a, is impressed across the primary 21 of transformer 20 and a series of pulses, such as represented by Fig. 2b, are impressed across the input terminals 9, the circuit will perform in the following fashion. When tube 1 is energized, it conducts and condenser 7 obtains a charge whereby cathode 3 becomes positive with respect to grid 4. When grid 4 is driven positively by the incoming pulse, tube 1 becomes conducting to a greater extent and the charge on condenser 7 is correspondingly increased. When a series of pulses such as shown in Fig. 2b are impressed on grid 4, condenser 7 assumes an essentially constant charge of such magnitude that grid 4, when at ground potential, is below the cutoff voltage of tube 1. The charge on condenser 7 is made sufficiently large by proper choice of resistor 6 and condenser 7 so that the grid cutoff voltage of tube 1 becomes that represented by the dotted line $k$ of Fig. 2b.

When grid 4 of tube 1 is driven positively by a pulse $g$, shown in Fig. 2b, tube 1 becomes conductive during the time pulse $g$ exceeds the grid cutoff voltage $k$ represented by the dotted line. A resultant negative pulse (not shown) results at anode 2 of tube 1.

The resultant negative pulse of anode 2 of tube 1 is impressed through condenser 17 upon the grid 14 of the normally conducting tube 11 rendering the tube nonconducting. A resultant positive pulse, as indicated at $i$ in Fig. 2c, appears on anode 12 of tube 11. In a corresponding fashion, a pulse $h$, Fig. 2b, causes a positive pulse $j$, Fig. 2c, to appear at anode 12 of tube 11. Since the grid cutoff voltage of tube 1 is maintained near the value of pulse $h$, it is apparent by inspection of pulses $i$ and $j$ of Fig. 2c that tube 1 is acting as a clipper amplifier. By this means pulses indicative of the difference between consecutive pulses $g$ and $h$ may be obtained without amplifying over a range including the total amplitude of either. The difference between consecutive pulses is thus emphasized by tubes 1 and 11. It will be understood that while conventional sine wave half-cycle pulses are illustrated in Fig. 2, pulses of any other wave shape will cause operation in the same manner as described.

For purposes of description, assume the instantaneous polarity of secondary 22 of transformer 20 to be such that the solid line of Fig. 2a represents the voltage of anode 23 of tube 18. The corresponding voltage of anode 24 of tube 19 is then shown by the dotted line of Fig. 2a. Thus, anode 23 is positive with respect to ground and anode 24 of tube 19 is below ground potential during the interval when pulse $i$ of Fig. 2c is impressed upon grids 31 and 32 of tubes 18 and 19, respectively. Tube 19, therefore, remains nonconductive and tube 18 is in a conductive state, so that a charge on condenser 29 appears and reaches a value dependent upon the magnitude of pulse $i$ in Fig. 2c. During the next half cycle of the energizing source impressed across transformer 20, tube 19 is in a conductive state and tube 19 charges condenser 30 to a magnitude dependent upon the incoming pulse $j$, Fig. 2c. Thus, during one-half of each cycle of the energizing source across transformer 20, condenser 29 is charged to an extent dependent upon the magnitude of pulse $i$, Fig. 2c, and condenser 30 is charged during the remaining half of each cycle to an extent dependent upon the magnitude of pulse $j$, Fig. 2c. Each will be charged with such polarity that cathodes 25 and 26, respectively, become positive with respect to ground. During nonconducting periods of their respective tubes, condensers 29 and 30 will be discharged to some extent through their respective shunting resistors 27 and 28. The voltage existing across condenser 29 may be illustrated by the curve of Fig. 2d, and that across condenser 30 by Fig. 2e. Since the voltage variations on condensers 29 and 30 are gradual compared with the pulses $i$ and $j$, Fig. 2c, impressed on grids 31 and 32, it is apparent that either of the cathodes 25 and 26 may be maintained at ground potential, instead of grounding the center tap of secondary 22 without disturbing the described action of grids 31 and 32.

Since the polarities by which condensers 29 and 30 are energized as described above, the voltage across them in series is equal to the difference between their instantaneous values. This voltage difference may be illustrated by the curve of Fig. 2f. It is apparent that the magnitude of the voltage represented by Fig. 2f is dependent upon the difference in amplitude between pulses $g$ and $h$, Fig. 2b, and its direction or polarity is dependent upon which of the two is the greater. Thus if pulse $h$ exceeds pulse $g$, the voltage of Fig. 2f becomes negative, and if $g$ and $h$ are of equal magnitude, the voltage $f$ is essentially zero. It should be noted that the voltage represented by Fig. 2f is influenced by the presence of resistors 27 and 28 in parallel with condensers 29 and 30, respectively. Resistors 27 and 28 are necessary to allow the charges on condensers 29 and 30 to follow the magnitude of the incoming pulses $g$ and $h$, respectively. Thus, if the expected change in magnitude between $g$, $g'$ and $g''$, Fig. 2b, is small, resistor 27 may be correspondingly increased. In similar fashion, resistor 28 may be increased if the expected change between $h$ and $h'$, Fig. 2b, is small. It is desirable to utilize resistance values for resistors 27 and 28 which are large in order to minimize variation in the voltage shown in Fig. 2f. The voltage $f$ appears across the terminals 35 and is proportional to the difference between the pulses $g$ and $h$ and this voltage may be used for indication recording and control purposes. The voltage at terminals 35 is independent of variations in voltage at the frequency of transformer 20 and also independent of changes in tube characteristics of amplifier tubes 1 and 11. In some cases where amplification is unnecessary, the clipper amplifier tubes 1 and 11 may be dispensed with.

As will occur to those skilled in the art, various different arrangements and combinations of the principles described above may be employed without departing from the true spirit and scope of the invention, and I, therefore, do not wish to limit my invention to the particular arrangement described. For instance, where feasible, pairs of electronic devices may be combined and contained in a single enclosure.

What I claim as new and desire to secure by Letters Patent of the United States is:

1. Electronic apparatus for obtaining a direct voltage proportional to the average difference between consecutive pulses of a series of positive polarity voltage pulses of a given frequency, comprising a pair of electronic devices having plate, grid and cathode electrodes, and a self-biased circuit for said devices consisting essentially of a transformer having a secondary connected across the plates of said devices, a condenser and resistance in parallel connected between the cathode of one device and the center point of the secondary of said transformer, a similar condenser and resistance in parallel connected between the cathode of the other device and the center point of the secondary of said transformer, said cathodes being separated by the condensers connected in series, means connecting the grids of said devices together, a grid-lead resistor connected between said grids and the center of the transformer secondary, means for coupling said grids to the source of pulses to be compared, and means for supplying the primary of said transformer from a source of alternating current of one-half the pulse frequency, the pulses and supply to the devices causing them to alternately conduct such that one condenser receives a charge proportional to the magnitude of alternate pulses and the other condenser receives a charge proportional to the remaining pulses and a direct current voltage appears across the condensers in series which is proportional to the difference in the condenser voltages.

2. An electronic peak comparator detector circuit, comprising an amplifier clipper having input terminals adapted to be supplied by a series of positive direct current voltage pulses of a given frequency, an amplifier phase inverter having its input coupled with the output of the clipper amplifier tube, said two tubes serving to clip and amplify the pulses and emphasize the differences if any between consecutive pulses, a pair of peak comparator electron devices having plate, grid and cathode electrodes with their grids coupled to the output of the amplifier phase inverter, a transformer having a secondary winding connected between the plates of the peak comparator devices and with their cathodes separated and connected through similar condensers to the center of the secondary winding of the transformer, a resistance connection between the grids of the peak comparators and the center of the secondary winding of the transformer, similar resistors connected across each of said condensers, and means whereby the primary of said tranformer may be supplied by alternating current of one-half the frequency of the pulse frequency, said peak comparators becoming alternately conductive in proportion to the pulse voltage applied to their respective grids and charging their corresponding condensers accordingly.

3. In electronic apparatus wherein a series of voltage pulses of predetermined frequency is provided, alternate ones of such pulses having magnitudes respectively proportional to two quantities to be compared, the combination in a self-biased circuit of two electronic devices each having a plate, a grid, and a separate cathode, two resistors connected in series between the cathodes of said devices, capacitors connected in parallel with said resistors respectively, coupling means to apply the voltage pulses between the junction of said resistors and the grids of said devices, circuit means to apply alternating voltages at one-half the pulse frequency between the junction of said resistors and the respective plates of said devices, the alternating voltages applied to the two plates being in phase opposition so that said devices are alternately conductive as successive pulses are applied to the grids, and output terminals connected between the two cathodes, whereby a direct voltage is obtained at the output terminals having a magnitude proportional to the difference in the two quantities compared and a polarity determined by the sign of such difference.

DON M. JACOB.

REFERENCES CITED

The following references are of record in the file of this patent:

UNITED STATES PATENTS

| Number | Name | Date |
| --- | --- | --- |
| 2,356,567 | Cockrell | Aug. 22, 1944 |
| 2,454,128 | Boothroyd | Nov. 16, 1948 |